(12) United States Patent
Shapiro

(10) Patent No.: US 6,964,110 B2
(45) Date of Patent: Nov. 15, 2005

(54) RULER

(75) Inventor: David Shapiro, Chicago, IL (US)

(73) Assignee: It's Academic of Illinois, Inc., Northbrook, IL (US)

( * ) Notice: Subject to any disclaimer, the term of this patent is extended or adjusted under 35 U.S.C. 154(b) by 499 days.

(21) Appl. No.: 10/361,075

(22) Filed: Feb. 7, 2003

(65) Prior Publication Data

US 2004/0154175 A1 Aug. 12, 2004

(51) Int. Cl.[7] .............................. B43L 7/00; B43L 7/10
(52) U.S. Cl. ........................................... 33/458; 33/495
(58) Field of Search .......................... 33/458, 483, 494, 33/495, 496, 497, 498, 499, 500, 809

(56) References Cited

U.S. PATENT DOCUMENTS

| | | | | |
|---|---|---|---|---|
| 580,918 A | * | 4/1897 | Willcox | 33/458 |
| 1,926,091 A | * | 9/1933 | Gasstrom | 33/458 |
| 2,559,961 A | * | 7/1951 | Howell | 33/458 |
| 3,308,543 A | * | 3/1967 | Fenton | 33/458 |
| 3,503,130 A | * | 3/1970 | Ferguson | 33/458 |
| 3,934,351 A | | 1/1976 | Sullivan | |
| 4,203,227 A | * | 5/1980 | Giroux | 33/458 |
| 4,426,790 A | | 1/1984 | Kimel | |
| D387,689 S | | 12/1997 | Sharon et al. | |
| 6,003,235 A | * | 12/1999 | Chen | 33/458 |
| 6,145,210 A | * | 11/2000 | Walczynski | 33/458 |

\* cited by examiner

*Primary Examiner*—G. Bradley Bennett
(74) *Attorney, Agent, or Firm*—Wood, Phillips, Katz, Clark & Mortimer

(57) ABSTRACT

A distance measuring tool including a plurality of substantially flat unit members each having ears at opposite ends of opposing sides and measurement marks along a side extending between the opposing sides, with pivot members pivotably secured between the ears at opposite ends of opposing sides of adjacent unit members. The unit members are pivotally secured to adjacent pivot members along two spaced pivot axes, where the ears define the pivot axes a distance X from the ends of the ears and the pivot members define the pivot axes spaced apart a distance at least 2X. The unit members have a thickness Y and the pivot members have a width W, where 2X<W<2Y and, in another form, the ears are rounded to avoid interference with an adjacent ear when the unit members are pivoted relative to the pivot members. The pivot axes are defined by axially aligned pins pivotably received in recesses.

24 Claims, 3 Drawing Sheets

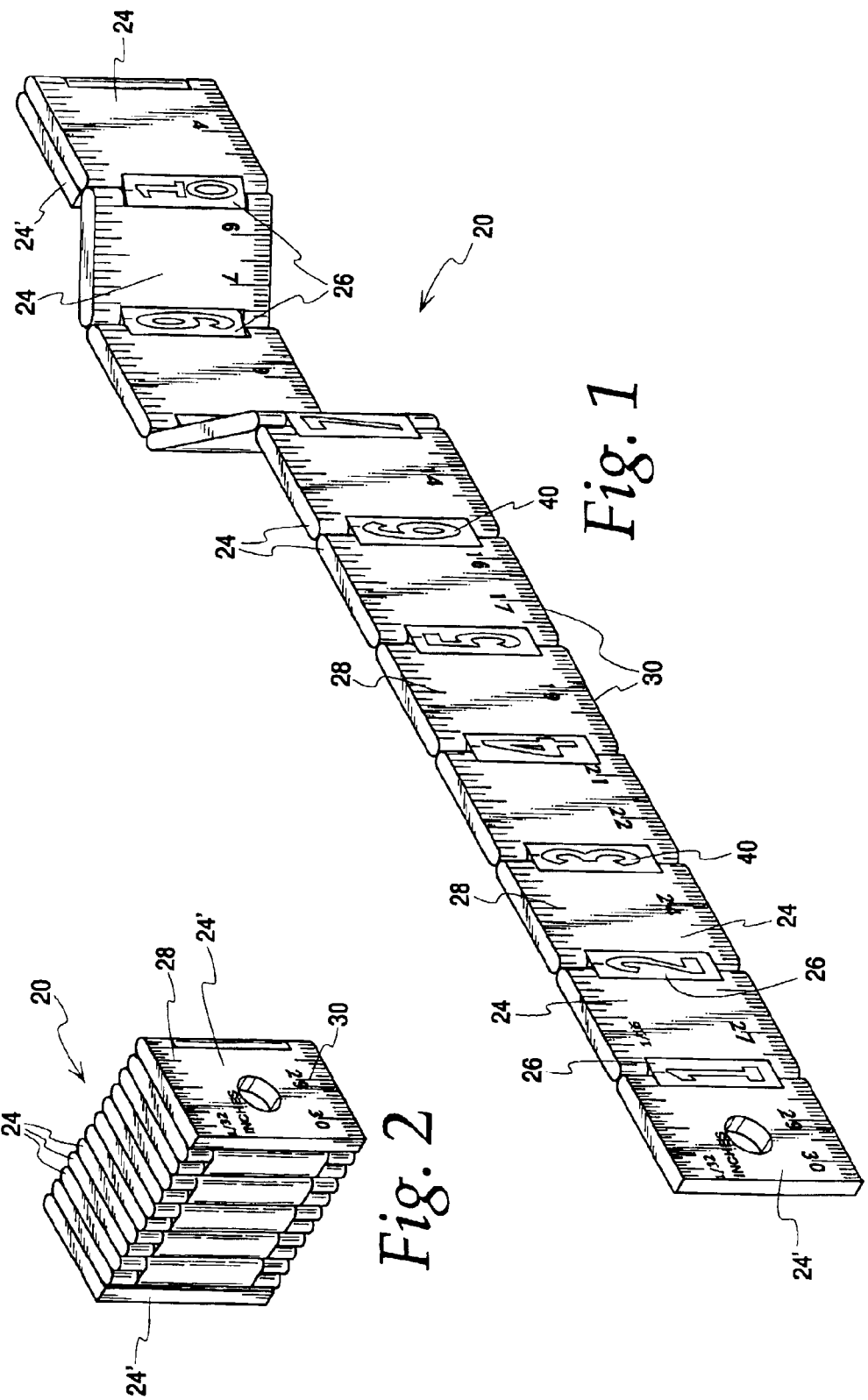

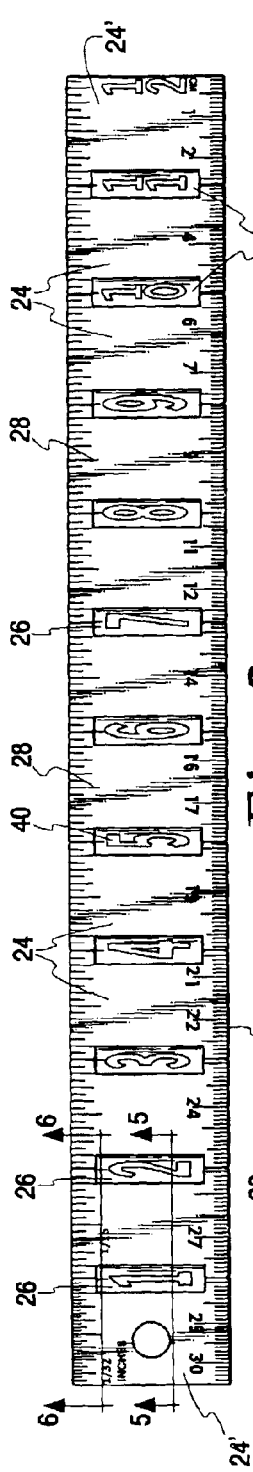

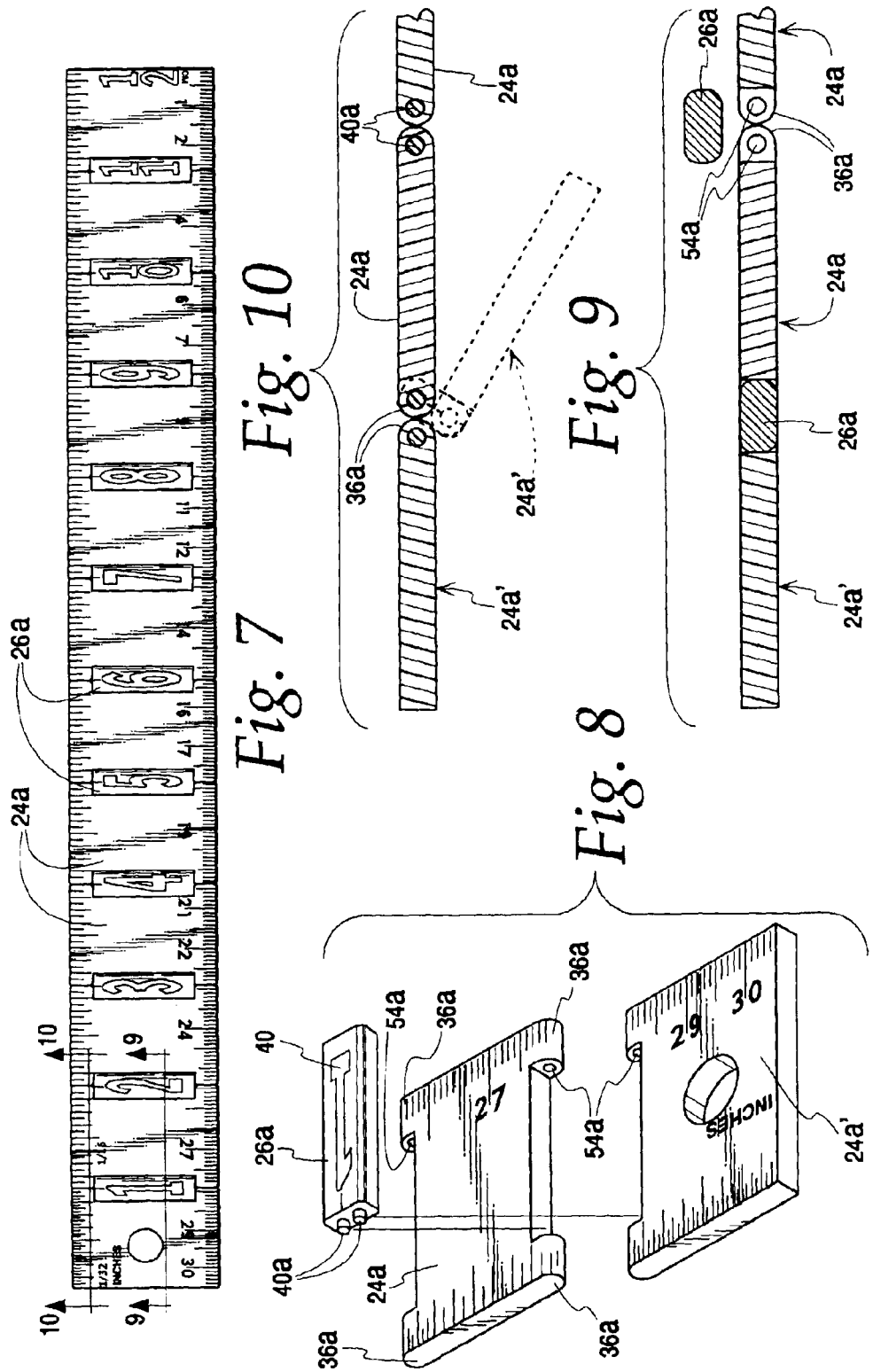

RULER

BACKGROUND OF THE INVENTION

The present invention relates to distance measuring tools, and more particularly to rulers.

Tape measures, rulers of varying lengths (e.g., twelve inch rulers and yardsticks), folding (zig-zag) rulers, and more recently electronic devices (using, e.g., lasers) are all tools which are well known in the art for measuring distances. While each such tool can be used for that function, each also has their advantages and drawbacks for different uses.

Thus, electronic devices may be used in many applications and, depending on the device, may be used to measure short distances and/or long distances. For example, many land surveyors use laser measuring devices in their work. Of course, such devices are generally expensive and relatively complicated to use and thus are not appropriate for many users.

Tape measures may more easily be used to measure a variety of distances, including relatively long distances of hundreds of feet. Further, such tape measures may also be flexible enough to allow use in measuring other than straight line distances. However, the flexibility of tape measures is a disadvantage in measuring short distances, where rigid rulers are more convenient and less costly.

Such rigid rulers have a wide variety of uses, including not only measuring relatively small straight distances (e.g., up to twelve inches) but also functioning as straight edges for use in drawing straight lines. Further, such rulers have been widely used to teach various physical and mathematical concepts to school children. As a result, such rulers are not only something which can be used in schools, but are something which most schools typically require that a student include among his or her supplies. Therefore, it should be recognized that such rulers are often used by inexperienced and, in many cases, not yet fully coordinated children. Thus, they may not be readily used to measure anything other than straight lines. Further, their length may make it difficult for a person to carry (e.g., twelve inch rulers are typically too long to carry in a pocket, and even shorter rulers which may fit in an owner's pocket when walking may be broken or jab the owner when they sit down with it in their pocket). Zig-zag rulers, such as shown in U.S. Pat. No. 4,426,790, have been used to permit rigid rulers to be used to measure distances longer than the length of the ruler when folded. However, such zig-zag rulers are also relatively difficult to use, especially for school children, are not readily usable to measure anything other than straight lines, and due to the planar offset of each leg of the zig-zag ruler cannot be readily used as a straight edge and may somewhat distort the measurements taken (since the planar offset, which is slightly greater than the thickness of each leg, may either require that the legs be tilted slightly along the direction of measurement or may prevent the legs at each end of the distance being measured from being disposed directly against the object to allow for most accurate reading).

Other folding measuring devices are shown in, e.g., U.S. Pat. Nos. D-387,689 and 3,934,351. However, such devices have various drawbacks, such as susceptibility toward breaking after repeated bending, cost (of materials and/or manufacture, and/or the inability to be compactly stored when not in use.

The present invention is directed toward overcoming one or more of the problems set forth above.

SUMMARY OF THE INVENTION

In one aspect of the present invention, a distance measuring tool is provided including a plurality of substantially flat first members each having ears at opposite ends of opposing sides, a plurality of substantially flat second members pivotably secured between the ears at opposite ends of opposing sides of adjacent first members, and measurement marks along one end of one of the plurality of first and second members.

In one form of this aspect of the invention, the plurality of second members are pivotally secured to adjacent first members along two spaced pivot axes, where the ears on the first members define the pivot axes a distance X from the ends of the ears and the second members define the pivot axes spaced apart a distance at least 2X. In a further form, the first members have a thickness Y and the second members have a width W, where $2X<W<2Y$ and, in another form, the ears are rounded to avoid interference with an adjacent ear when the first members are pivoted relative to the second members.

In another form of this aspect of the invention, pins are pivotably received in recesses to secure the second members between the ears. The pins may be axially aligned. In a first alternate form, the pins may project toward one another from the ears at opposite ends of opposing sides with the recesses being in the second members, or in a second alternate form the pins may project from opposite sides of the second members with the recesses in facing surfaces of the ears. In the first alternate form, the second members comprise facing sections secured together to define the recesses therebetween, which facing sections may be ABS plastic secured together by sonic welding. In the second alternate form, the pins may be elastically deformable.

In still another form, the first members may be substantially I shaped.

In yet another form, the first members may have a length substantially equal to one unit of measurement of the measurement marks, and the second members may have sequential markings thereon indicating the cumulative number of first members to the left of the second member. The one unit of measurement may be one inch.

In another form, the first members may have a thickness Y and the second members may have a width no greater than 2Y. In this form, the second members may secure pivot axes of adjacent first members, where the pivot axes are spaced apart a distance on the order of Y.

In another aspect of the present invention, a distance measuring tool is provided, including a plurality of substantially flat unit members each having ears at opposite ends of opposing sides and measurement marks along a side extending between the opposing sides, with pivot members pivotably secured between the ears at opposite ends of opposing sides of adjacent unit members.

Various forms previously described as usable with the first described aspect of the present invention may also be used with this aspect of the invention.

BRIEF DESCRIPTION OF THE DRAWINGS

FIG. 1 is a perspective view of a distance measuring tool embodying the present invention;

FIG. 2 is a perspective of the distance measuring tool of FIG. 1 in a folded storage position;

FIG. 3 is a plan view of the FIG. 1 distance measuring tool laid flat;

FIG. 4 is an exploded view illustrating the assembly of one embodiment of the present invention;

FIG. 5 is a cross-sectional view taken along line 5—5 of FIG. 3, showing a hinge assembly on the right in an unassembled position;

FIG. 6 is a cross-sectional view similar to FIG. 5 taken along line 6—6 of FIG. 3, with a phantom indication of the left unit member in a pivoted position;

FIG. 7 is a plan view of an alternate embodiment of the distance measuring tool when laid flat;

FIG. 8 is an exploded view illustrating the assembly of the FIG. 7 alternate embodiment of the present invention;

FIG. 9 is a cross-sectional view taken along line 9—9 of FIG. 7, showing a hinge assembly on the right in an unassembled position; and FIG. 10 is a cross-sectional view taken along line 10—10 of FIG. 7, with a phantom indication of the left unit member in a pivoted position.

DETAILED DESCRIPTION OF THE INVENTION

FIGS. 1–2 illustrate in perspective view a ruler 20 which embodies the present invention. Specifically, the ruler 20 includes a plurality of substantially flat unit members 24 which are pivotally interconnected as described further below by a plurality of substantially flat pivot members 26.

In the illustrated embodiment, the unit members 24 may advantageously have a length which is substantially equal to an integral number of units of measurement wide. For example, in a twelve inch ruler such as illustrated, there may advantageously be twelve unit members 24, each of which is substantially one inch wide as described further below. Measurement marks 28 may also be provided along at least one side of the unit members 24, such as the 1/16 inch marks shown in the Figs., with one unit member 24 having marks 28 indicating 1/32 inches. Measurement marks 30 of a different scale (e.g., millimeters) may be provided along other sides of the unit members 24 if desired, including on the back of the unit members 24.

However, it should be understood that while the one inch unit members 24 illustrated may be advantageously used, different size unit members 24 could also be used. Moreover, while a variety of sizes having a width substantially equal to integral numbers of units (e.g., 1 inch, or 2 or 3 mm) may be advantageously used, some of the advantages of the present may still be achieved even with units having odd widths which are not even sections of the measurement units to be measured by the ruler 20.

Except for the unit members 24' at the opposite ends of the ruler 20, each unit member 24 includes ears 36 at opposite ends of opposing sides, with a notch between the ears 36 on each side. The unit members 24 thus have an "I" configuration. The unit members 24' at the opposite ends of the ruler 20 may include ears 36 at opposite ends of only one side.

The pivot members 26 are each shorter than the unit members 24 so that they may fit in the notch between ears 36 of adjacent unit members 24. Further, the pivot members 26 may be provided with sequential markings 40 such as numerals which indicate the cumulative number of measurement units along the ruler 20. Therefore, for example, where each unit member is one inch wide as described, the pivot members 26 may be sequentially marked with "1" through "11", each indicating the number of unit members 24 to the left of the pivot member 26, which numeric marking corresponds to the number of inches to the end of the ruler 20.

A variety of pivotable connections between the unit members 24 and the pivot members 26 could be used to obtain some of the advantages of the present invention. However, FIGS. 3–6 and 7–10 illustrate two embodiments using pivotable connections which may be particularly advantageously used.

Specifically, in the FIGS. 3–6 embodiment, facing sides of the unit member ears 36 include aligned pivot pins 44 defining a pivot axis on opposite sides of the unit members 24 (and on one side of the end unit members 24'). The pivot members 26 each comprise a pair of facing sections 50, 52, which each define opposite sides of pin receiving recesses 54. Assembly of the ruler 20 may thus be accomplished by positioning the mating facing sections 50, 52 of a pivot member 26 so as to capture the pins 44 of adjacent unit members 24 in the pin receiving recesses 54. The facing sections 50, 52 are then suitably secured together to secure the pins 44 therein. For example, the facing sections 50, 52 may be made of a strong material such as ABS plastic and then secured together by sonic welding. The unit members 24 may be made, for example, of polypropylene.

As illustrated in FIG. 2, the ruler 20 may be advantageously folded into a substantially compact shape which is no wider than the unit members 24 and no thicker than the thickness of the unit members 24 (Y, as shown in FIG. 5) times the number of such unit members 24 in the ruler 20 (e.g., 12Y in a twelve inch ruler having one inch unit members 24 as illustrated). Specifically, this most compact shape may be accomplished by providing:

a. Pivot members 26 which have a width (W, as shown in FIG. 5) no wider than 2Y, so that, when folded, the sides of the pivot members 26 do not project beyond the surfaces of the connected unit members 24;

b. Pivot axes defined by the pin receiving recesses 54 which are spaced apart a distance which is on the order of the unit member thickness Y, so that, when folded, the unit members 24 may be positioned substantially against one another with minimal spacing therebetween;

c. Pivot axes defined by the pins 44 which are X distance from the ends of the ears 36 (see FIG. 5), with the pivot members 26 at least 2X wide, so that pivot axes of adjacent unit members 24 may be secured in a parallel relationship at a spacing of at least 2X so that the adjacent unit members 24 may be positioned to lie in the same plane with their ears 36 in a near abutting relationship; and d. Half cylindrical rounded ends of the ears 36 and sides of the pivot members 26, so that they may be pivoted in a close relationship to one another such as illustrated in FIG. 6 without corners which would abut and interfere with such advantageous pivoting.

Any of the above relationships may be advantageously used within the scope of the present invention, with at least some of the advantages of the present invention being obtainable without requiring all of these features.

FIGS. 7–10 illustrate an embodiment similar to the FIGS. 3–6 embodiment except that the pivot pins 44a project from opposite ends of the pivot members 26a, with the pin receiving recesses 54a defined in the facing surfaces of the ears 36a. It should thus be appreciated that the previously described W, X and Y dimensions and configurations may also be advantageously used with the FIGS. 7–10 embodiment.

While the unit members 24a, 24a' of the FIGS. 7–10 embodiment could be formed from facing sections such as the facing sections of the pivot members 26 of the FIGS. 3–6 embodiment, in the illustrated embodiment the unit members 24a, 24a' are unitary. The pivot pins 44a may be formed of an elastically deformable material allowing the pivot pins 44a to be bent during assembly in order to position them in the facing recesses 54a between the fixed ears 36a of the unit members 24a, 24a'. Once so positioned, the elastic properties of the material will cause the pins 54a to return to their original configuration, defining the pivot axes securing the adjacent unit members 24a, 24a' together.

As already mentioned, still other pivotable connections could also be used within the broad scope of the invention. For example, the ears could be provided on the pivot members, with the pivot members substantially the same height as the unit members. In such a structure, the pivot member ears would fit in notches in the corners of the unit members, with the pivot member ears pivotably secured in those notches (so that the pivot members would have the "I" configuration, and the unit members would be more of a cross [+] configuration).

It should now be appreciated that rulers 20 according to the present invention may provide one or more of a variety of advantages. That is, such rulers may be easily folded for compact storage and therefore may be easily carried in locations where a full length rigid ruler cannot. For example, a twelve inch ruler cannot readily be carried in a pocket, and if a school child were to attempt to do so, he/she would risk tearing their clothes and/or jabbing themselves with the ruler end, particularly when they sit down. Rulers 20 according to the present invention can also be used to roughly measure curved lines and surfaces. For example, a twelve inch ruler 20 can be folded around a 12-inch softball to substantially encircle its circumference. Similarly, the easy pivoting of the ruler 20 will allow it to be positioned upright on a curved line to again roughly measure the length of the line. Such uses can be significant teaching aids for students who are learning concepts relating to measurements and the like (including, e.g., demonstrating via examples that the shortest distance between two points is a straight line). Still further, rulers 20 according to the present invention may be easily handled and used, even by young students. Moreover, where the unit members 24 are integral units of measurement wide (e.g., one inch) such as described, the unit members 24 themselves as well as the sequential markings 40 on the pivot members 26 provide a prominent indication of integral units of measurement to significantly assist students in learning measurement concepts.

Still other aspects, objects, and advantages of the present invention can be obtained from a study of the specification, the drawings, and the appended claims. It should be understood, however, that the present invention could be used in alternate forms where less than all of the objects and advantages of the present invention and preferred embodiment as described above would be obtained.

What is claimed is:

1. A distance measuring tool comprising:
   a plurality of substantially flat first members positioned adjacent one another, each having opposing longitudinal side portions and opposing transverse side portions, said transverse side portions having ears formed at opposite ends of the opposing transverse side portions;
   a plurality of substantially flat second members pivotably secured between said ears at opposite ends of opposing transverse side portions of adjacent first members; and
   measurement marks along at least one end of one of said plurality of first and second members.

2. The distance measuring tool of claim 1, wherein said ears are rounded to avoid interference with an adjacent ear when said first members are pivoted relative to said second members.

3. The distance measuring tool of claim 1, further comprising pins pivotably received in recesses to secure said second members between said ears.

4. The distance measuring tool of claim 3, wherein said pins are axially aligned.

5. The distance measuring tool of claim 3, wherein said pins project toward one another from said ears at opposite ends of opposing sides and said recesses are in said second members.

6. The distance measuring tool of claim 5, wherein second members comprise facing sections secured together to define said recesses therebetween.

7. The distance measuring tool of claim 6, wherein said facing sections are ABS plastic secured together by sonic welding.

8. The distance measuring tool of claim 3, wherein said pins project from opposite sides of said second members and said recesses are in facing surfaces of said ears.

9. The distance measuring tool of claim 8, wherein said pins are elastically deformable.

10. The distance measuring tool of claim 1, wherein said first members are substantially "I" shaped.

11. The distance measuring tool of claim 1, wherein said first members have a length substantially equal to one unit of measurement of said measurement marks, and said second members have sequential markings thereon indicating the cumulative number of first members to the left of said second member.

12. The distance measuring tool of claim 11, wherein said one unit of measurement is one inch.

13. The distance measuring tool of claim 1, wherein said first members have a thickness Y and said second members have a width no greater than 2Y.

14. A folding ruler, comprising:
    a plurality of substantially flat, generally rectangular first members, each having a opposing longitudinal side portions and opposing transverse side portions, said longitudinal side portions having a length substantially equal to one inch and having measurement marks along at least one of the opposing longitudinal side portions; and
    a plurality of second members pivotally connecting respective transverse portions of immediately adjacent first members so that the immediately adjacent first members fold one on top of another with said front surfaces positioned in facing relationship with respect to one another so as to form a stack of said first members.

15. The folding ruler of claim 14, wherein the transverse portions of said first members are formed with outwardly extending ears at opposite ends thereof and said second members are pivotally secured between said ears.

16. The folding ruler of claim 15, wherein said ears are rounded to avoid interference with an adjacent ear when said first members are pivoted relative to said second members.

17. The folding ruler of claim 14, further comprising axially aligned pins received in recesses to secure said second members between said ears.

18. The folding ruler of claim 17, wherein said pins project toward one another from said ears at opposite ends of said transverse side portions and said recesses are in said second members.

19. The folding ruler of claim 18, wherein said second members comprise facing sections secured together to define said recesses therebetween.

20. The folding ruler of claim 19, wherein said facing sections are ABS plastic secured together by sonic welding.

21. The folding ruler of claim 18, wherein said pins project from opposite sides of said second members and said recesses are in facing surfaces of said ears.

22. The folding ruler of claim 17, wherein said pins are elastically deformable.

23. The folding ruler of claim 14, wherein said second members have sequential markings thereon indicating the cumulative of first members to the left of said second member.

24. The folding ruler of claim 14, wherein said first members have a thickness of Y and said second members have a width no greater than 2Y.

* * * * *